(12) United States Patent
Tideback

(10) Patent No.: US 7,323,637 B2
(45) Date of Patent: Jan. 29, 2008

(54) ELECTRICAL BOX ROLLER TO FACILITATE WIRE PULLING

(76) Inventor: Patricia Tideback, 2005 Belmont Pkwy., NW., Cedar Rapids, IA (US) 52405

( * ) Notice: Subject to any disclaimer, the term of this patent is extended or adjusted under 35 U.S.C. 154(b) by 0 days.

(21) Appl. No.: 11/469,691

(22) Filed: Sep. 1, 2006

(65) Prior Publication Data
US 2007/0044985 A1    Mar. 1, 2007

Related U.S. Application Data

(60) Provisional application No. 60/713,418, filed on Sep. 1, 2005.

(51) Int. Cl.
    *H02G 3/08* (2006.01)
(52) U.S. Cl. ............... 174/50; 174/59; 174/64; 248/906; 220/4.02; 439/535
(58) Field of Classification Search .......... 174/50, 174/59, 64; 254/134.3 FT, 415; 220/4.02; 439/535; 248/906
    See application file for complete search history.

(56) References Cited

U.S. PATENT DOCUMENTS

| 4,358,089 A | 11/1982 | Metcalf |
| 4,382,649 A * | 5/1983 | Meyer ................. 439/147 |
| 4,541,615 A | 9/1985 | King, Jr. |
| 4,946,137 A | 8/1990 | Adamczek |
| 5,029,817 A | 7/1991 | Tamm |
| 5,038,003 A * | 8/1991 | Allec et al. ............ 174/138 F |
| 5,096,163 A | 3/1992 | Swearingen |
| 5,236,177 A | 8/1993 | Tamm |
| 5,271,605 A | 12/1993 | Damron |
| 6,672,567 B1 | 1/2004 | Chembars |
| 2002/0134881 A1 | 9/2002 | Hoernig |

\* cited by examiner

*Primary Examiner*—Dhiru R. Patel
(74) *Attorney, Agent, or Firm*—McKee, Voorhees & Sease, P.L.C.

(57) ABSTRACT

A roller is provided in combination with an electrical junction box to facilitate pulling of wires through the box. The roller has a spring mounted plunger on one end adapted to be received within a pre-existing hole in a side wall of the box, and a press-fit stud on the opposite end to be received within a pre-existing hole on the opposite side wall of the box. The plunger and stud rotatably support the roller within the box so that wires can be pulled over the roller by a person at a location remote from the junction box. The roller can be quickly and easily installed in the junction box using only one hand.

19 Claims, 2 Drawing Sheets

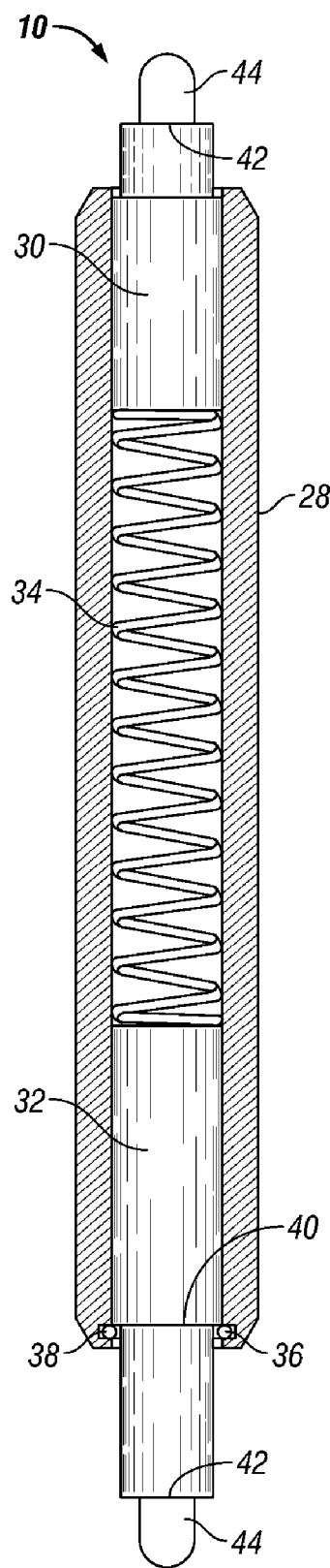
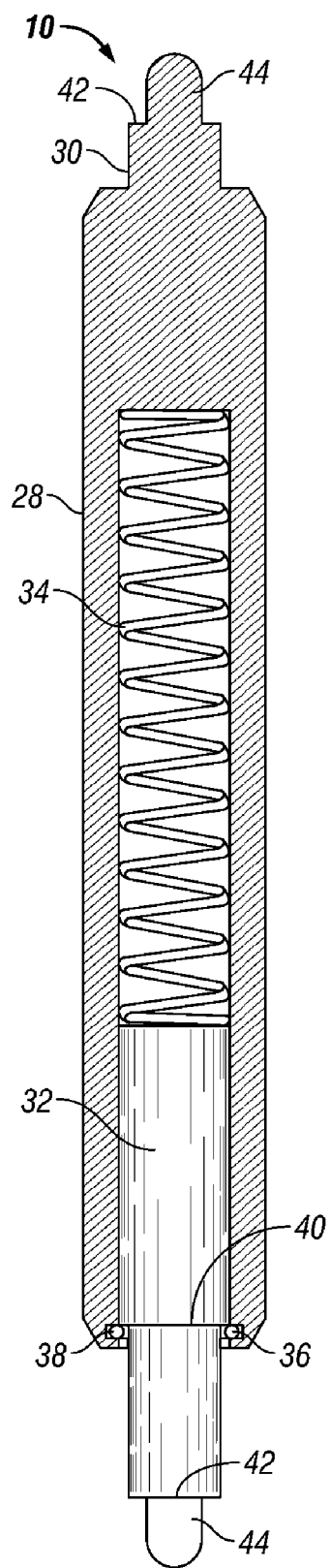
FIG. 3          FIG. 4

ELECTRICAL BOX ROLLER TO FACILITATE WIRE PULLING

PRIORITY STATEMENT

This application claims priority to U.S. Provisional Patent Application No. 60/713,418, filed Sep. 1, 2005, herein incorporated by reference in its entirety.

FIELD OF THE INVENTION

The present invention relates to the electrical wiring industry, and more particularly, to a roller to facilitate pulling of wires through an electrical junction box.

BACKGROUND OF THE INVENTION

Virtually all residential and commercial buildings use electrical wires for providing electrical power throughout the building. The wires typically are pulled through conduits to electrical junction boxes, wherein the wires may terminate or may continue to other locations throughout the building. Various prior art rollers have been utilized to facilitate the pulling of wires through the electrical boxes. However, such prior art rollers generally are complex, and require at least two hands to install. Prior art electrical box rollers are often bulky, and are typically mounted on the outside of the junction box, thus requiring additional structure to connect the roller to the box. The size, complexity, and installation of such rollers necessarily increase the costs of pulling wires through a building. Therefore, it is desirable to have a simpler electrical junction box roller to facilitate pulling of wires through buildings.

Accordingly, a primary objective of the present invention is the provision of a roller for quick and easy mounting within an electrical junction box so as to allow for easier pulling of wires through the box.

Another objective of the present invention is the provision of a roller temporarily mounted in an electrical junction box having a conduit extending into the box, such that wires can be pulled through the conduit and the box from a remote location.

A further objective of the present invention is the provision of the combination of an electrical junction box with a roller to facilitate pulling of wire through the box by one person.

Still another objective of the present invention is the provision of a roller and electrical junction box combination which allows wire to be pulled through a conduit connected to the junction box from an angle which is not co-extensive with the longitudinal axis of the conduit.

Yet another objective of the present invention is the provision of a method of mounting a roller in an electrical junction box using only one hand to facilitate pulling of wires through the box.

Another objective of the present invention is the provision of a roller having at least one spring mounted end which can be quickly and easily installed using one hand into an electrical junction box to facilitate pulling of wires through the box.

Another objective of the present invention is the provision of a roller for use in pulling wires through an electrical junction box, which is economical to manufacture and durable and effective in use.

These and other objectives will become apparent from the following description of the invention.

BRIEF SUMMARY OF THE INVENTION

The present invention is directed towards a roller which is used in combination with an electrical junction box to facilitate pulling of one or more wires through the box by one person from a location remote from the box. The roller is quickly and easily installed in the box and removed therefrom using one hand. The roller includes a body with opposite first and second ends. First and second studs extend from the body ends and are adapted to be rotatably received in pre-existing holes in opposite first and second side walls of the junction box, so as to rotatably support the roller in the box. The first stud is spring mounted in the body of the roller for movement between extended and retracted positions.

The method of installing the roller into the box begins by inserting the spring mounted stud into the first hole in the first side wall of the box, and then compressing the spring so that the second stud can be aligned with the second hole in the opposite side wall of the box. The spring is then allowed to expand so that the second stud is inserted into the second hole, whereby the studs rotatably support the roller in the box. The stud insertion steps are accomplished using only one hand. The wire or wires can then easily be pulled through the box by a person at a remote location from the box.

BRIEF DESCRIPTION OF THE DRAWINGS

FIG. 3 is a sectional view showing the components of the assembled roller.

FIG. 4 is a sectional view showing an alternative embodiment of the roller.

DETAILED DESCRIPTION OF THE PREFERRED EMBODIMENT

Figure 1:
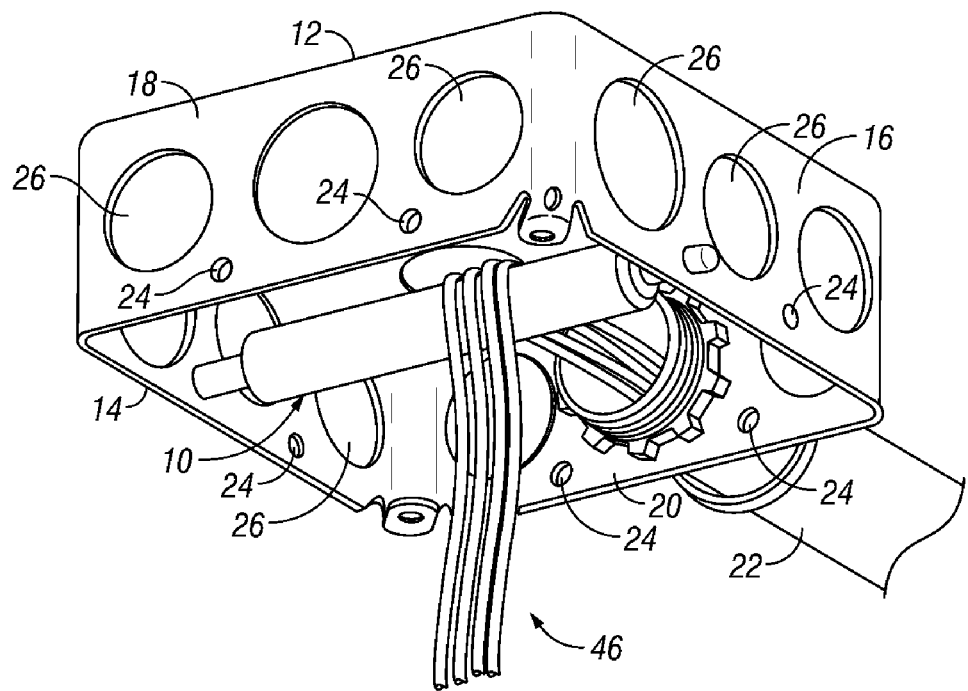
FIG. 1 is a perspective view of an electrical junction box with a conduit attached thereto and the roller of the present invention installed.

The roller of the present invention is generally designated by the reference numeral 10 in the drawings. The roller is intended for use in an electrical junction box 12. The junction box 12 has four sides, which for purposes of the drawings are designated as opposite or side walls 14 and 16, and opposite front or rear walls 18 and 20. An electrical conduit 22 may extend into any of the sides, such as the rear wall 20, as seen in FIG. 1. The walls 14, 16, 18 and 20 have pre-existing holes 24, which typically have a diameter of $3/16^{th}$ inch. The sides of the box 12 also have knock-outs 26 which can be punched out so that additional conduits may be connected to the box 12. The structure of the box 12 is conventional.

Figure 2:
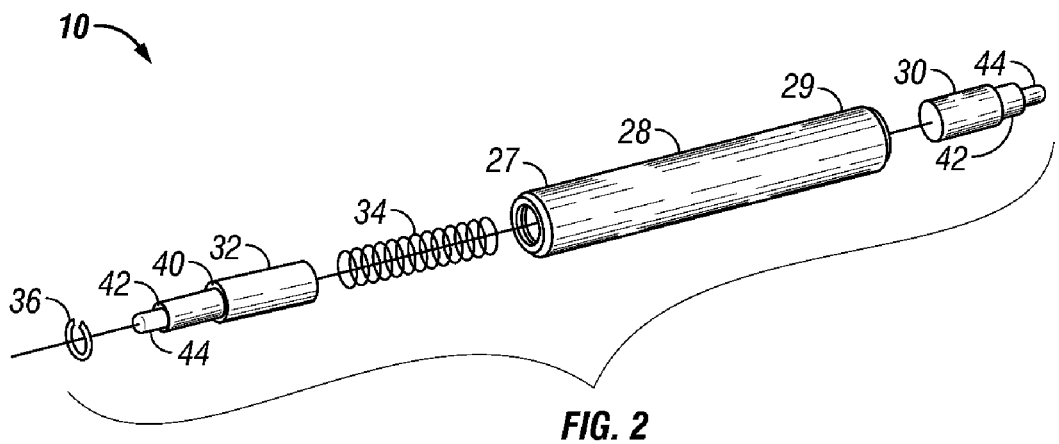
FIG. 2 is an exploded perspective view of the electrical junction box roller of the present invention.

As best seen in FIGS. 2 and 3, the roller 10 includes a hollow body 28 with opposite ends 27, 29. A first stud 30 is press-fit into one end of the body 28, while a second stud or plunger 32 is spring mounted in the opposite end of the body 28. As an alternative to the press fitting of the stud 30, the stud 30 and body 28 may be formed as one piece, such as by casting or molding, as seen in FIG. 4. A spring 34 within the body 28 biases the stud 32 to an extended position. The stud or plunger 32 is retained within the body 28 by a snap ring 36, which is received within a groove 38 in a second end of the body 28 and which engages a first shoulder 40 on the stud or plunger 32. Each stud 30, 32 includes an exterior shoulder 42 with a reduced-diameter tip 44.

The installation of the roller 10 into the junction box 12 is quickly and easily accomplished using only one hand. First, the tip 44 of the stud or plunger 32 is inserted into one of the holes 24 in the side wall 14 of the box 12. The spring 34 is compressed so that the tip 44 of the stud 30 can be aligned with the hole 24 in the opposite side wall 16 of the box 12. Spring 34 is then allowed to expand so that the tip 44 of the stud 30 extends through the hole 24 in the side wall 16 of the box, whereby the shoulders 42 of the studs 30, 32 engage the inside surfaces of the side walls 14, 16 and the tips 44 rotatably support the roller 10 within the box 12. The roller 10 thus extends transverse to the axis of the conduit 22. Preferably, the diameter of the body 28 is sufficiently small so that the roller 10 resides fully within the junction box 12. Also the upper surface of the body 28 preferably resides above the lower most inside diameter of the conduit 22 so that the wires 46 extending through the conduit 22 do not rub against the end of the conduit. The roller 10 can also be quickly and easily removed from the box 12 using one hand by moving the body 28 toward the plunger 32, to compress the spring 34, and thereby allow the stud 30 to be removed from the hole in the wall 16, and then removing the plunger from the hole in wall 14.

The size of the roller 10 and spring loaded plunger 32 allows a person to quickly and easily install and remove the roller 10 using one hand, so that the other hand is free. The free hand can be used for balance and safety, for example, if the person is on a ladder, or to hold a tool or other piece of equipment.

The roller 10 allows a person to pull wires through the conduit 22 and the junction box 12 from a location remote from the junction box, such as a different location in the room, or from a different room. Also, the roller 10 allows the wires to be pulled from angles ranging nearly 180° in a vertical plane below the longitudinal axis of the conduit 22. For example, the wires 46 can be pulled from a position directly below the junction box 12, or from positions rearward and forward of the junction box. Thus, the wire 22 can be pulled from an angle which is not coaxial with the conduit.

The roller 10 can be manufactured in different lengths, so as to accommodate different sized electrical junction boxes 12.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. In combination, an electrical junction box and a roller to facilitate pulling of wire through the electrical junction box, the box having opposite first and second sides with aligned holes therein and opposite third and fourth sides extending between the first and second sides, with an electrical conduit extending into the box through one of the third and fourth sides, the roller comprising:
    a hollow body having opposite first and second ends;
    first and second studs extending from the body ends and rotatably received in the holes in the first and second sides of the box to rotatably support the roller in the box; and
    the first stud being spring biased so that the roller can be installed in the box using one hand.

2. The roller of claim 1 wherein the second stud is press fit into the second end of the body.

3. The roller of claim 1 wherein the first stud has a shoulder, and the first end of the body has a groove, and further comprising a snap ring received in the groove to retain the first stud in the body.

4. The roller of claim 1 wherein the body is hollow.

5. The roller of claim 1 further comprising a spring in the body to bias the first stud to an extended position.

6. The roller of claim 1 wherein the first stud is moveable between a retracted position for installing the roller in the box and an extended position to retain the roller in the box.

7. The roller of claim 1 wherein the body has a diameter sufficiently small such that the body resides fully within the box.

8. The roller of claim 1 wherein the body extends transverse to the conduit.

9. The roller of claim 8 wherein the body has an upper surface residing in a plane extending above the inside diameter of the conduit.

10. The roller of claim 1 wherein the each stud has a shoulder for engaging the first and second sides of the box, and a reduced diameter tip to extend through the holes in the box.

11. A roller and electrical junction box combination to facilitate pulling of wire through the electrical junction box, comprising:
    a hollow roller body having opposite ends;
    one of the ends of the roller body being spring biased;
    the roller body mounted within the box with the ends received in pre-existing holes in opposite sides of the box.

12. The roller of claim 11 wherein the body has a press fit stud in one end and a spring mounted plunger in the opposite end.

13. The roller of claim 12 further comprising a snap ring to retain the plunger in the roller.

14. The roller of claim 12 further comprising a spring inside the body to bias the plunger to an extended position.

15. The roller of claim 11 wherein the body has a diameter sufficiently small such that the body resides fully within the box.

16. The roller of claim 11 wherein an electrical conduit extends into the box, and the body has an upper surface residing above a lower most inside diameter of the conduit.

17. The roller of claim 11 wherein the stud and the plunger each have a shoulder for engaging the opposite sides of the box, and a reduced diameter tip to extend through the holes in the box.

18. The roller of claim 11 wherein the ends of the roller are rotatable within the pre-existing holes in the box.

19. A method of mounting a roller in an electrical junction box to facilitate pulling of wires through the electrical junction box, comprising:
    inserting a first spring mounted stud on a first end of the roller into a first pre-existing hole in a first side wall of the box;
    compressing a spring within the roller;
    aligning a second stud on the second end of the roller with a second pre-existing hole in a second side wall of the box;
    allowing the spring to expand so that the second stud is inserted within the second hole;
    the studs rotatably supporting the roller within the box; and
    the stud insertion steps being accomplished using only one hand.

* * * * *